United States Patent [19]

Müller et al.

[11] Patent Number: 4,616,881
[45] Date of Patent: Oct. 14, 1986

[54] TRACTOR-TRAILER BRAKE SYSTEM INCLUDING A TRAILER BRAKE CONTROL VALVE

[75] Inventors: Egbert Müller, Eberdingen-Hochdorf; Ingolf Grauel, Vaihingen/Enz; Werner Stumpe, Kornwestheim, all of Fed. Rep. of Germany

[73] Assignee: Robert Bosch GmbH, Stuttgart, Fed. Rep. of Germany

[21] Appl. No.: 669,740

[22] Filed: Nov. 7, 1984

Related U.S. Application Data

[63] Continuation of Ser. No. 415,301, Sep. 7, 1982, abandoned.

[30] Foreign Application Priority Data

May 21, 1982 [DE] Fed. Rep. of Germany ....... 3219140

[51] Int. Cl.⁴ .................. B60T 8/02; B60T 13/26; B60T 13/68; B60T 13/74
[52] U.S. Cl. .............................. 303/7; 303/15; 303/52; 303/113; 303/22 R; 303/84 R
[58] Field of Search .................. 303/7, 3, 8, 6 A, 9, 303/6 R, 6 M, 13–17, 91, 93, 100, 84 A, 84 R, 71, 28–30, 50–56, 22 R, 113–119, 20, 25–27; 188/3 R, 156, 158, 106 P, 195

[56] References Cited

U.S. PATENT DOCUMENTS

| | | | |
|---|---|---|---|
| 2,985,489 | 5/1961 | Stelzer | 303/7 X |
| 3,001,831 | 9/1961 | Stelzer | 303/7 |
| 3,180,694 | 4/1965 | Stelzer | 303/7 |
| 3,232,674 | 2/1966 | Stelzer | 303/7 |
| 3,275,381 | 9/1966 | Pfeifer | 303/7 |
| 3,497,267 | 2/1970 | Dobrikin | 303/15 X |
| 3,545,815 | 12/1970 | Berg | 303/13 X |
| 3,756,661 | 9/1973 | Michellone | 303/7 |
| 3,774,975 | 11/1973 | Schmidt | 303/7 |
| 3,790,807 | 2/1974 | Rossigno | 303/7 |
| 4,358,163 | 11/1982 | Young | 303/22 R |
| 4,418,966 | 12/1983 | Hattwig | 303/22 R X |

FOREIGN PATENT DOCUMENTS

| | | | |
|---|---|---|---|
| 2452171 | 5/1976 | Fed. Rep. of Germany | |
| 2129079 | 5/1984 | Fed. Rep. of Germany | 303/3 |
| 1085081 | 9/1967 | United Kingdom | |
| 2073835 | 10/1981 | United Kingdom | |

Primary Examiner—Douglas C. Butler
Attorney, Agent, or Firm—Edwin E. Greigg

[57] ABSTRACT

A tractor-trailer braking system with a control valve for the trailer which is controllable by at least two service brake circuits of the tractor. One circuit of this multi-circuit control has an electrical control in the form of magnetic valves, or the like, in order to speed up the control process. The system may be combined with a load-dependent switching element and/or with an anti-skid protection-dependent switching element.

9 Claims, 3 Drawing Figures

TRACTOR-TRAILER BRAKE SYSTEM INCLUDING A TRAILER BRAKE CONTROL VALVE

BACKGROUND OF THE INVENTION

This is a continuation of copending application Ser. No. 415,301 filed Sept. 7, 1982, now abandoned.

The invention is based on a tractor-trailer brake system, described hereinafter. Such a brake system is known (German Offenlegungsschrift No. 24 52 171).

In this known brake system the control valve in the trailer is switchable as a dual circuit by the increase in pressure in the front axle or rear axle brake circuit or—as a third circuit—by the decreasing pressure in an emergency or parking brake circuit. However, the air used for control has to travel long distances through the lines and thus causes a slowing of the switching. Such delay causes a riding-up of the trailer and an increase in the stopping distance which can cause accidents.

OBJECT AND SUMMARY OF THE INVENTION

In contrast to the foregoing, the tractor-trailer brake system according to the invention has the advantage that the control valve of the trailer is switched rapidly so that the response time of the brake is considerably shortened from the response time ordinarily encountered heretofore.

The invention will be better understood and further objects and advantages thereof will become more apparent from the ensuing detailed description of preferred embodiments taken in conjunction with the drawings.

BRIEF DESCRIPTION OF THE DRAWINGS

Several exemplary embodiments of the invention are shown in the drawings and explained in more detail in the following description.

DESCRIPTION OF PREFERRED EMBODIMENTS

Figure 1:
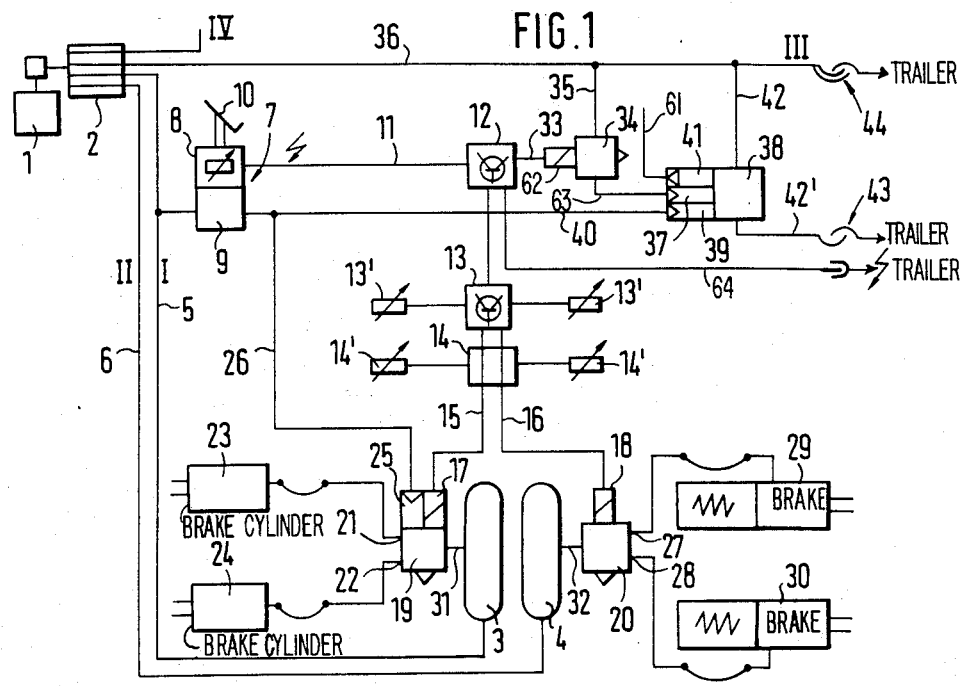
FIG. 1 shows a first embodiment of a tractor-trailer brake system according to the invention.

A tractor-trailer brake system is supplied by an air compressor 1 disposed on the tractor, which supples compressed air to four brake circuits by way of a subsequent quadruple-circuit safety valve 2 to which the four brake circuits are connected. The brake circuits I and II are service brake circuits for supplying compressed air at the front and rear wheels of the tractor, the compressed air is supplied from supply tanks 3 and 4, which are connected to the quadruple-circuit safety valve 2 by means of a supply line 5 or 6, respectively.

A dual-circuit brake control means 7 is a foot-operated braking signal transducer disposed on the tractor, having an electric supply control 8 such as a potentiometer and a pneumatic valve member 9 which controls compressed air both of which are simultaneously operable by a driver by way of a pedal 10. Movement of the foot pedal closes the electrical circuit first and then with further movement opens the valve to permit compressed air to flow from line 5 to lines 26 and 40. Since the electric control is a potentiometer, the further the foot pedal is pressed, the greater the current flow to a control device 12.

The electric supply 8 has a single output which is connected with an electronic control device 12 via an electrical line 11 which controls current to three different circuits, one of which is a load-dependent switching element 13 whose output for separate brake control depends on a vehicle's load sensor 13' which emits an electrical signal to the electronic switching element depending upon the load of the vehicle. The outputs from the switching element 13 are directed to anti-skid protection-dependent switching element 14 whose outputs depend upon wheel revolution sensors 14'. These sensors operate as well known in the art, such as when the wheels skid or have stopped rotating and it is desirous for the wheels to rotate, the brakes are relaxed by application of a signal to element 14 which decreases the signal to the electromagnets thereby permitting less compressed air to go to the brakes. Once the wheels start rotating, the brakes will again be applied due to a greater signal from element 14. The switching elements 13 and 14 are provided subsequent to the electronic control device 12. The arrangement is made in such a way that the load-dependent and the anti-skid protection monitoring is formed with dual channels, in that two separate lines 15 and 16 lead from the switching elements 13 and 14 to the electromagnets 17 and 18 which control the front and rear brakes of the tractor, respectively, via pressure control valves 19 and 20, respectively. If there is no signal from elements 13' or 14' to switching elements 13 and 14, the current from control 12 is directed to controls 17 and 18 unmodified by the switching elements 13 and 14.

The pressure control valve 19 is normally closed and is controlled electrically by an electromagnet 17 or pneumatically by a pressure means 25 to open the valve. If there is an applied electrical current, the electromagnet opens the valve and there is no effect from the pressure means. However, if there is no electrical current applied to the electromagnet then the pressure means 25 will open the control valve. The control valve is used to control compressed air flow to actuate the front axle brakes. For this purpose it has two outlets 21 and 22, which are connected from axle brake cylinders 23 and 24. Furthermore, pressure control valve 19 has parallel to the electromagnet 17 a compressed air control chamber 25, by way of which a compressed air linkage from control valve 9 opens control valve 19 to permit compressed air to flow to the front axle. The chamber 25 is connected by way of a compressed air control line 26 to the valve member 9 of the brake control means 7.

In contrast thereto, the pressure control valve 20 is a normally closed valve and is electrically controlled and which can only be operated by way of the electromagnet 18. The control valve 20 is used to control the compressed air flow to the rear axle brakes and has two outlets 27 and 28 for that purpose, to which a rear axle brake cylinder 29 and 30 is connected, respectively. The rear axle brake cylinders 29 and 30 are formed as single-chamber spring loaded brake cylinders, which, however, form no part of the present invention.

Each compressed air pressure control valve 19 and 20 is connected immediately by way of a short line 31 and 32 with one of the two supply tanks 3 and 4, as shown.

It is also possible to interchange both pressure control valves 19 and 20, so that the pressure control valve 19 of the front axle brake cylinders 23 and 24 is only controllable electrically and the pressure control valve 20 of the rear axle brake cylinders 29 and 30 is controllable electrically and pneumatically.

An electrical line 33 is connected to the electronic control device 12, which leads to an electro-magnetic control valve 34 (or perhaps to groups of same). The electro-magnetic control valve 34 controls the flow of compressed air through a compressed air line 35, which leads from a supply line 36 of a trailer (brake circuit III) to an inlet of a compressed air control 37 of a control valve 38 of the trailer. A second compressed air control inlet 39 of the control valve 38 of the trailer can be charged by compressed air from the valve element 9 by means of a line 40, and a third control inlet 41 can be controlled with a decrease of the pressure during braking by way of a parking brake, not shown, via line 61. The compressed air of line 40 and the control from the hand brake are applied to valve 38 as insurance to ensure that the valve 38 is operated by at least one control.

The control valve 38 of the trailer is placed, in a known manner, in a line 42 branching from the supply line 36 of the trailer, the line from control valve 38 is designated as brake line 42' of the trailer starting at the control valve 38 of the trailer, and which is brought to the trailer via a pair of coupling heads 43 in the same way as the supply line 36 of the trailer is brought in via a pair of coupling heads 44.

A third electrical line 64 from the electronic control 12 can be directed to the trailer for use in an electrical braking system if desired.

Mode of Operation

When activating the dual-circuit brake control means 7, the electric supply control 8 as well as the compressed air control valve element 9 are switched on and opened, respectively. The current reaches the electronic control device 12 by way of the line 11 and is transformed there to supply a current to switching element 13, electromagnetic control 33 and to the trailer; then the load-dependent switching element 13 enters a load value from load sensors 13' and the anti-skid protection-dependent switching element 14 enters a brake value resulting from sensors 14', and the respective result is brought to the electromagnets 17 and 18 of control valves 19 and 20 by way of the lines 15 and 16. The electrical current applied to electromagnets 17 and 18 causes the electromagnets to operate thereby opening the valves 19 and 20 which permits compressed air to flow to the brakes 23, 24 and 29, 30. The control valves 19 and 20 are opened, dependent upon the respective current strength dictated by elements 13 and 14. The electromagnets 17 and 18 switch the pressure control valves and stored compressed air is supplied from the supply tanks 3 and 4 in a short way to the brake cylinders 23, 24, 29, and 30, Thus, front and back wheels of the tractor are braked.

Prior to the above brake action, the following takes place at the control valves 38 for the trailer: At the same time an electrical signal reaches the electronic control device 12 the electromagnet 62 of the magnetic control valve 34 is switched on, which opens valve 34 to permit the compressed air from the supply line 36 to the trailer to reach the compressed air control inlet 37 under controlled conditions via the line 63. The control valve 38 of the trialer switches over and the brake line 42' to the trailer is charged, which results in the braking of the trailer.

It should be understood that in case of the loss of compressed air via this action on the control valve 38 for the trailer, the latter can also be activated by way of the compressed air line 40 from the valve element 9 (brake circuit I) or by the parking brake via line 61. In any case, the activation of the brake of the trailer has to come before the braking of the tractor, so that the tractor-trailer combination remains stretched out. Such a pre-activation is safely accomplished by means of the rapid control of the brake valve 38 via the magnetic valve 34 as long as the control system via valve 38 remains intact.

Subsequent to activation of control valve 38 the pressure valves 19 and 20 are electrically activated, their compressed air reaches the chamber 25 of the pressure control valve 19 from the valve element 9 via the control line 26 in the tractor. In case the pressure control valve 19 has already been switched over electrically by electro-magnet 17, this charging of the switching chamber remains without effect. The compressed air is directed to chamber 25 as insurance in case the electrical current does not activate the valve 19.

If the electrical system has failed, further braking is made possible in the respective brake circuit by way of the pressure chamber 25, so that the vehicle can still be brought to a stop. By taking the controlling compressed air and the work energy (supply tank 3) from the same brake circuit I, a dependable dual-circuitry of the system is assured. The electronic control provided by the electronic elements 12, 13 and 14 is monitored in this case not only load-dependently, but also dependent from the working of the anti-skid protection device. The sensors 13' and 14' may monitor one or several axles or even one or several wheels. In addition, the pressure control valves 19 and 20 can be embodied with single control as shown by valve 20 or dual channels as shown by control valve 19 and can be disposed in relation to an axle or a wheel.

Figure 2:
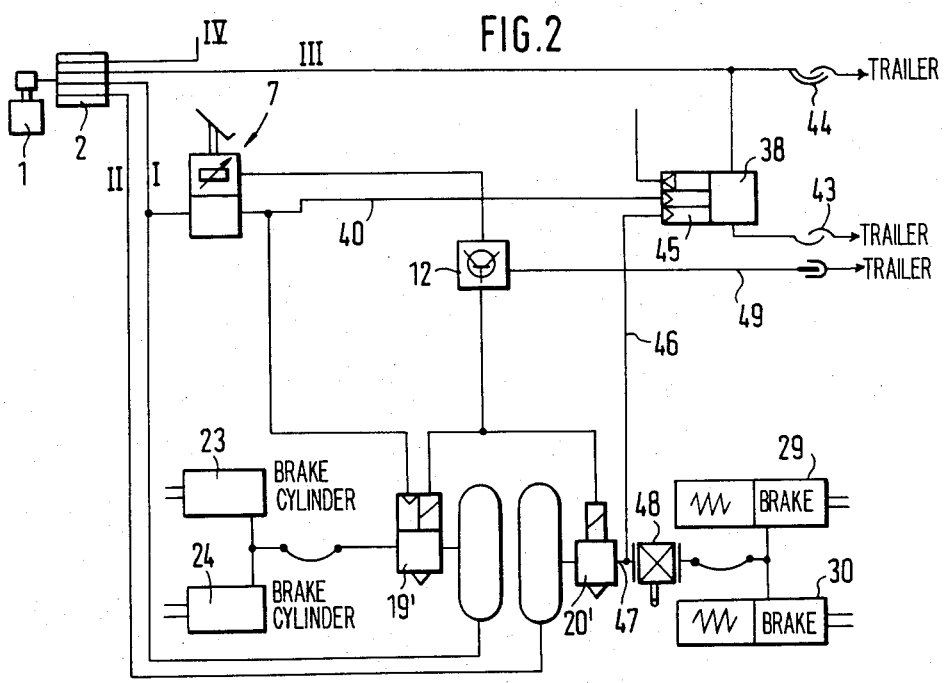
FIG. 2 shows another embodiment of a tractor-trailer brake system of the invention.

FIG. 2 shows a similar construction as FIG. 1, comparable parts therefore have the same reference numerals.

In this exemplary embodiment a compressed air control input 45, of the control valve 38 of the trailer has been branched off from a compress air connection line 47 by way of a pressure line 46, the connection line 47 leading from an electrically controllable pressure control valve 20' to the rear axle brake cylinders 29 and 30. In this connection, line 47 there is additionally disposed a load-dependent brake pressure regulator 48, which, however, can also be replaced by an electrical load cell, as in the construction according to FIG. 1. It is furthermore possible to have the system work analog, as shown, or digital, which is not shown; in the latter case the pressure has to be monitored behind the pressure control valves 60, 20'. This also holds for the constructions in accordance with the other figures. The pressure control valves 60 and 20' are here only formed with a single channel, i.e., they only have a single outlet. But they can also be disposed in such a way that the pressure control valve 20' lies in the brake circuit of the front axle with a single electrical control and the pressure control valve 60 in the brake circuit of the rear axle for dual control as set forth above for valves 19 and 20 of FIG. 1.

Finally, an electric line 49 to the trailer has been connected to the electronic control element 12 in order to be able to control the brakes in the trailer electrically, as well. The electronic control element 12 functions the same in the system of FIG. 2 as it does in FIG. 1.

Figure 3:
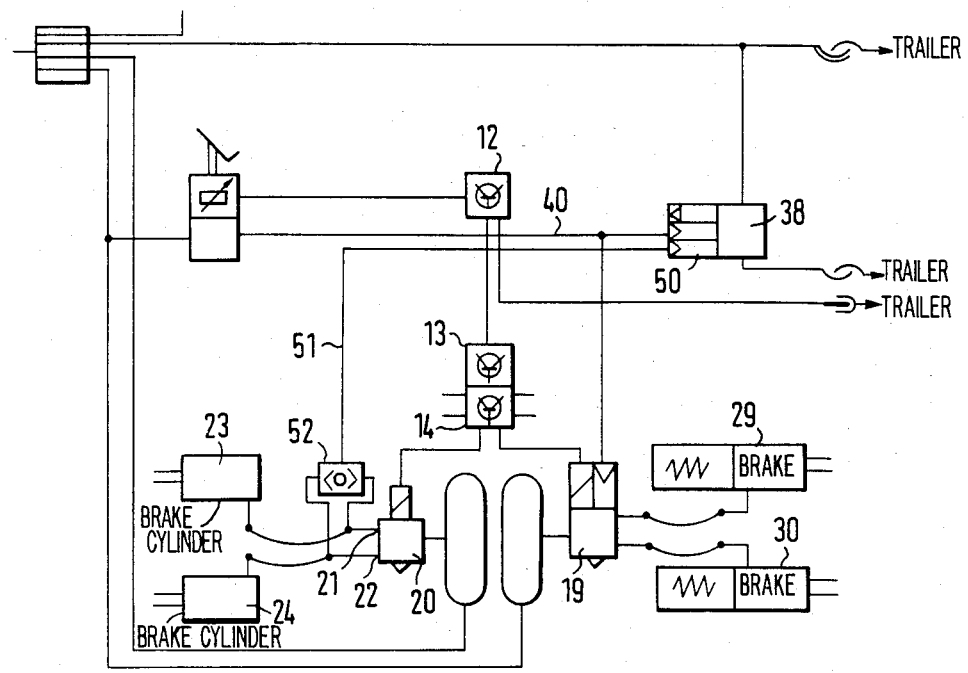
FIG. 3 shows yet a further embodiment of the system according to the invention.

Again, a comparable brake system has been shown in FIG. 3, using the same reference numerals. Both pressure control valves 19 and 20 are formed with dual outlet channels, so that they can supply the brake cylinders 23, 24 and 29, 30 separately and individually. The system comprises an electronic load-dependent control as well as an electronic anti-skid protection monitoring system, similar as the one according to FIG. 1. The control valve 38 of the trailer has an inlet compressed air control 50, which can be charged via a line 51 by one of two outlets 21, 22, i.e., by one of two outlet channels of the pressure control valve 20. The two-way back-pressure valve 52 is used which only permits compressed air in the channel with the higher compressed air pressure to reach the control valve 38 to the trailer by way of the line 51. Preferably, the pressure valve 20, which is only electrically controllable, is used for this, since in the case of electrical failure the substitute use of a pressure medium, as is made possible by the pressure control valve 19, would cause a control signal to arrive later at the control valve 38 of the trailer than it is possible by way of the line 40 with brake circuit I.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A tractor-trailer compressed air brake system having a protective valve on said tractor for dividing compressed air from a compressed air supply source into four different compressed air circuits on said tractor and to said trailer, a dual-circuit brake control means on said tractor controlled by a foot-operated brake control pedal for operating a first and second service brake control circuit, a compressed air control valve on said tractor for controlling compressed air to said trailer, said compressed air control valve including at least two pressure control elements, one of said at least two pressure control elements controllable by said first service brake control circuit and another of said at least two pressure control elements controllable by said second service brake control circuit via said foot-operated dual circuit brake control means, one of said first and second service brake control circuits including an electrically responsive control circuit means for controlling one service brake control circuit and one control element of said control valve for the trailer.

2. A tractor-trailer brake system in accordance with claim 1, wherein one of said first and second service brake control circuits for said compressed air control valve for the trailer comprises at least one electrically operable electromagnetic control valve for permitting compressed air from a separate supply line to reach one of said control elements for said compressed air control valve for the trailer for providing a control pressure.

3. A tractor-trailer brake system in accordance with claim 2, characterized in that said electromagnetic control valve forms a part for the control valve of the trailer.

4. A tractor-trailer brake system in accordance with claim 1, wherein one of said first and second service brake control circuits of the control valve for the trailer comprises a branch from a compressed air connection line of an electrically controlled pressure control valve means to the rear wheel brakes.

5. A tractor-trailer brake system in accordance with claim 2, wherein said first and second service brake control circuit of the compressed air control valve of the trailer comprises a branch from a compressed air connection line of an electrically controlled pressure control valve means to the front wheel brakes.

6. A tractor-trailer brake system in accordance with claim 4, wherein said branch lies ahead of a load-dependent brake pressure regulator means inserted into the compressed air connection line to the rear wheel brakes.

7. A tractor-trailer brake system in accordance with claim 4, further having a load-dependent electronic switching element connected to said pressure control valve means.

8. A tractor-trailer brake system in accordance with claim 4, further having an anti-skid protection-dependent electronic switching element connected to said pressure control valve means.

9. A tractor-trailer brake system in accordance with claim 1, further having at least one pressure control valve means, a dual-channel pressure control outlet therefrom to at least two brake cylinders of the tractor, and a two-way back-pressure valve means connected to said dual channel pressure outlet wherein compressed air in the channel with the highest pressure of said dual-channel pressure control is connected to the control valve for the trailer for controlling said control valve.

* * * * *